United States Patent Office 2,965,643
Patented Dec. 20, 1960

2,965,643
DERIVATIVES OF PYRAZOLO (3,4-d) PYRIMIDINES

Jean Druey, Riehen, and Paul Schmidt, Therwil, Basel Land, Switzerland, assignors to Ciba Pharmaceutical Products Inc., Summit, N.J.

No Drawing. Filed Feb. 4, 1957, Ser. No. 637,897

Claims priority, application Switzerland Feb. 10, 1956

15 Claims. (Cl. 260—256.4)

This invention relates to new bicyclic heterocyclic compounds. More particularly the invention concerns 1-arylpyrazolo(3,4-d)pyrimidines unsubstituted in the 3-, 5- and 7-positions and having the nucleus of the formula

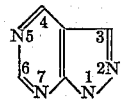

and hydro compounds thereof, as for example, the 2,3-, 4,5- or 6,7-hydro compounds, and their salts. They are preferably substituted in at least one of the positions 4 and 6; in particular, they contain in at least one of these positions a free or functionally converted hydroxyl or oxo group or a free or substituted mercapto or amino group, as for example an etherified or esterified hydroxyl or mercapto group, e.g. an alkoxy or alkylmercapto group or a halogen atom, or a mono- or disubstituted amino group, such as a dialkylamino, aminoalkyl- or dialkyl-aminoalkyl-amino or alkyleneaminoalkylamino group, a furyl-methylamino group or hydrazino group. In these substituents the hydrocarbon such as alkyl radicals are of low molecular weight, e.g. methyl, ethyl, propyl or butyl. The aryl radical is preferably a phenyl residue, such as an unsubstituted or an alkyl-, halogen- or nitro-substituted phenyl radical.

The compounds of the invention are new and have valuable pharmacological properties. They can be used as medicaments in a wide variety of fields; they can also be used as intermediates for the manufacture of medicaments. The 1-aryl-4-alkoxy-pyrazolo(3,4-d)pyrimidines for example have a caffeine-like action and can be used as stimulants and diuretics. Those of the new compounds which contain in the 4-position a halogen atom or a basic residue, such as an amino, aminoalkylamino, hydrazino, and preferably an amino-alkoxy or hydroxyl-amino group are characterized by a valuable activity against animal parasites, as for example against bacteria such as *Staphylococcus aureus*, fungi, amoebae, protozoa and trypanosoma.

Especially valuable with regard to the above activities are the following compounds which represent a specific embodiment of our invention, non-equivalent to the remaining subject matter of it: 1-(substituted or unsubstituted-phenyl)-pyrazolo(3,4-d)pyrimidines which are unsubstituted in the 3-, 5-, 6-, and 7-positions and which contain in the 4-position a lower alkyleneamino group, such as an ethyleneimino, pyrrolidino, piperidino or morpholino group, a hydroxylamino or a tertiary amino-lower alkoxy group, such as a lower dialkylamino-lower alkoxy group, furthermore 1-(substituted or unsubstituted phenyl)-pyrazolo(3,4-d)pyrimidines, unsubstituted in the 3,5 and 7-positions, having in 6-position a lower alkyl or hydroxyl group and in 4-position a hydroxyl group.

The new compounds are made by reacting together a 5-unsubstituted 2-aryl-3-amino-pyrazole-4-carboxylic acid lower alkyl ester or amide with formamide, urea, thiourea or carboxylic acid anhydrides. The condensation to form the pyrazolo-pyrimidines takes place advantageously at a temperature above 100° C., if desired, in the presence of a diluent and/or condensing agent in an open vessel or under pressure. The reaction can be carried out in stages; 2-phenyl-3-amino-4-carbamyl-pyrazole for example can be acetylated first at the amino group, and then condensed in a second stage to form the 1-phenyl-4-hydroxy-6-methyl-pyrazolo(3,4-d)pyrimidine.

The resulting 1-aryl-pyrazolo(3,4-d)pyrimidines can be substituted in the usual manner or any substituents that are present can be modified. Thus hydroxyl or mercapto groups can be etherified, esterified or replaced by halogen atoms, or hydroxyl groups can be replaced by sulfur atoms. The halogen atoms can be exchanged for hydroxyl groups or for etherified hydroxyl or mercapto groups or for amino or hydrazino groups or hydrogen. Futhermore, it is possible to treat resulting hydroxy or thio compounds with reactive esters of alcohols, such as for example with alkyl halides or dialkyl sulfates to obtain derivatives substituted at the oxygen and/or sulfur. Hydro derivatives can be obtained by treatment with hydrogenating agents, such as catalytically activated hydrogen. More specifically in the compounds obtained hydroxyl groups can be replaced by halogen atom, such as chlorine or bromine, by treatment with phosphorus halides, e.g. phosphorus oxychloride; halogen atoms may be replaced by free or substituted amino groups by treatment with ammonia or the appropriate amines, hydroxyl groups can be etherified by treatment with halides of alcohols, preferably in the presence of a condensing agent, halogen atoms can be exchanged for free or substituted mercapto groups by treatment with thiourea or metal salts of mercaptans.

Depending on the substituents in the products of this invention, various salts can be made from these products. When they have free hydroxyl or mercapto groups, metal salts can be made. Compounds of basic character, such as those having basic substituents, form acid addition salts with therapeutically useful inorganic or organic acids, such as for example with hydrohalic acids, sulfuric acids, nitric acid, perchloric acid, phosphoric acids, formic acid, acetic acid, propionic acid, lactic acid, oxalic acid, succinic acid, malic acid, tartaric acid, citric acid, ascorbic acid, methane sulfonic acid, ethane sulfonic acid, hydroxyethanesulfonic acid, benzoic acid, salicylic acid, p-aminosalicylic acid, toluene sulfonic acid or naphthalene sulfonic acids.

The 3-aminopyrazoles used as starting material can be prepared by the process of our copending application Serial No. 637,895, filed on even date herewith and now abandoned.

The pyrazolopyrimidines of this invention and their salts can be used in the form of pharmaceutical preparations. These contain the said compounds in admixture with a pharmaceutical organic or inorganic carrier suitable for enteral, parenteral or topical administration. As carriers there are used substances that do not react with the aforesaid compounds, for example, gelatine, lactose, starches, magnesium stearate, talc, vegetable oils, benzyl alcohols, gums, polyalkylene glycols, white petroleum jelly, cholesterol or other carriers known for medicaments. The pharmaceutical preparations may be made up, for example, in the form of tablets, dragees, salves or creams, or in liquid form as solutions, suspensions, or emulsions. If desired, they may be sterilized and/or may contain auxiliary substances, such as preserving, stabilizing, wetting or emulsifying agents. They may contain other therapeutically valuable substances. The preparations can be made by the usual methods.

The following examples illustrate the invention, the parts being by weight unless otherwise stated:

*Example 1*

12 parts of 2-phenyl-3-amino-4-carbethoxy-pyrazole are heated for 8 hours with 40 parts by volume of formamide in a bath having a temperature of 200–210° C. After cooling, the crystalline precipitate is separated by filtration with suction, dissolved in 2 N-caustic soda solution, treated with animal charcoal, and precipitated by adjusting the pH to 3 with 2 N-hydrochloric acid. 1-phenyl-4-hydroxy-pyrazolo (3,4-d)pyrimidine of the formula

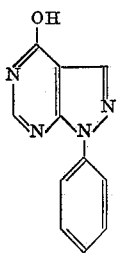

is obtained in the form of crystals melting at 286–288° C.

The starting material can be obtained as follows:

17 parts of ethoxy-methylene-cyanacetic acid ethyl ester are dissolved in 100 parts by volume of ethyl alcohol. The solution is then slowly mixed with a solution of 10.8 parts of phenyl-hydrazine in 50 parts by volume of ethyl alcohol. In order to complete the reaction the mixture is heated at the boil for 2 hours. The mixture is then evaporated to dryness, and the reddish oil which remains behind is crystallised by the addition of benzene. By recrystallisation from ethyl acetate with the addition of animal charcoal there is obtained 2-phenyl-3-amino-4-carbethoxy-pyrazole of the formula

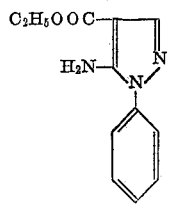

in the form of white crystals melting at 99–101° C.

*Example 2*

8 parts of 1-phenyl-4-hydroxy-pyrazolo(3,4-d)pyrimidine are heated with 40 parts by volume of phosphorus oxychloride for 2 hours at the boil. The phosphorus oxychloride is evaporated from the mixture and the residue is poured onto ice. The mixture is adjusted to a pH value of 8 with a 2 N-solution of caustic soda and extracted with benzene. The benzene residue is recrystallised from boiling ligroin and there is obtained 1-phenyl-4-chloro-pyrazolo(3,4-d)pyrimidine of the formula

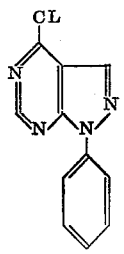

in the form of white crystals melting at 125–126° C.

*Example 3*

23 parts of 1-phenyl-4-chloro-pyrazolo(3,4-d)pyrimidine and 100 parts by volume of liquid ammonia are heated together in a closed tube for 6 hours at 120° C. After evaporating the liquid ammonia, there remains behind a white product which can be recrystallised from methylene chloride. In this manner there is obtained 1-phenyl-4-amino-pyrazolo(3,4-d)pyrimidine in the form of white crystals melting at 205–206° C., and having the formula

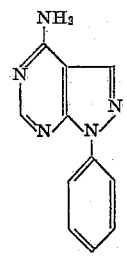

The hydrochloride of this compound is obtained from boiling 2 N-hydrochloric acid in the form of white crystals melting at 239–240° C.

*Example 4*

15 parts of dimethylamine are introduced into 200 parts by volume of benzene. To the solution are added 15 parts of 1-phenyl-4-chloro-pyrazolo(3,4-d)pyrimidine, and the whole is then heated for 3 hours in a closed tube at 100° C. After being cooled, the mixture is filtered with suction to remove precipitated dimethylamine hydrochloride, and the filtrate is evaporated to dryness in vacuo. The residue is recrystallized from boiling ligroin, and 1-phenyl-4-dimethylamino-pyrazolo(3,4-d)pyrimidine of the formula

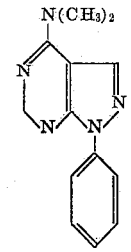

crystallizes in white crystals melting at 123–124° C. From a solution of the product in boiling 2 N-hydrochloric acid there is obtained the hydrochloride melting at 218–220° C.

*Example 5*

23 parts of 1-phenyl-4-chloro-pyrazolo(3,4-d)pyrimidine and 13 parts of aminoethyl-diethylamine are introduced into 500 parts by volume of toluene, and the mixture is boiled for 6 hours under reflux. The mixture is then evaporated to dryness in vacuo and the residue is crystallized from ethyl acetate. There is obtained the monohydrochloride of 1-phenyl-4-diethylaminoethyl-amino-pyrazolo(3,4-d)pyrimidine of the formula

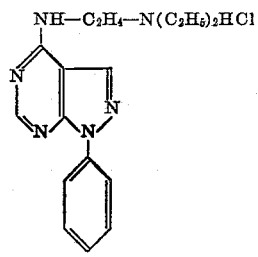

in white crystals melting at 141–143° C.

*Example 6*

23 parts of 1-phenyl-4-chloro-pyrazolo(3,4-d)pyrimidine and 20 parts of furfurylamine are introduced into 500 parts by volume of toluene, and the mixture is boiled for 10 hours under reflux. The whole is allowed to cool, filtered with suction to remove the crystalline precipitate, and a sample is crystallized from boiling ligroin. There is obtained 1-phenyl-4-furfurylamino-pyrazolo(3,4-d)-pyrimidine of the formula

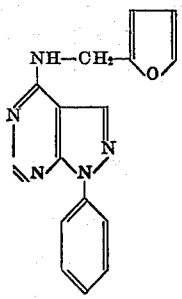

in the form of white crystals melting at 158–160° C. The crude material is boiled with 2 N-hydrochloric acid and the hydrochloride so obtained melts at 201–203° C. In a similar manner the methane sulfonate, the sulfate or the nitrate can be obtained.

*Example 7*

11.5 parts of 1-phenyl-4-chloro-pyrazolo(3,4-d)pyrimidine are introduced into a solution of 1.4 parts of sodium in 200 parts by volume of methyl alcohol. The mixture is then heated at the boil for 3 hours, allowed to cool, and the precipitate is filtered off with suction. The latter is crystallized from ligroin and there is obtained 1-phenyl-4-methoxy-pyrazolo(3,4-d)pyrimidine of the formula

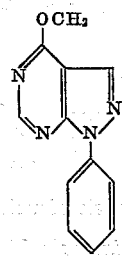

in the form of white crystals melting at 115–116° C.

*Example 8*

12 parts of 1-phenyl-4-chloro-pyrazolo(3,4-d)-pyrimidine are dissolved in 250 parts by volume of ethyl alcohol and the solution is mixed with 4.5 parts of the thiourea and heated for 10 hours at the boil. After being cooled the mixture is filtered with suction to remove the precipitated crystals, and the latter are recrystallized from a large quantity of ethyl alcohol. In this manner there is obtained 1-phenyl-4-mercapto-pyrazolo(3,4-d)-pyrimidine of the formula

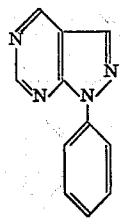

melting at 264–265° C.

*Example 9*

8.2 parts of 1-phenyl-4-hydroxy-pyrazolo(3,4-d)-pyrimidine are introduced into a solution of 0.9 part of sodium in 400 parts by volume of anhydrous alcohol. The whole is heated for 3 hours while stirring, then 4.5 parts of chloroethyl-dimethylamine are added, and the whole is boiled for 5 hours under reflux. The mixture is then evaporated to dryness in vacuo, 100 parts by volume of water are added, the mixture is filtered with suction to remove insoluble material and recrystallized from ligroin. The 1-phenyl-4-dimethylamino-ethoxy-pyrazolo(3,4-d)pyrimidine of the formula

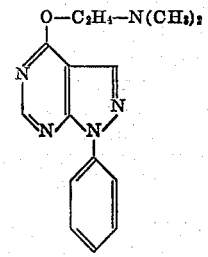

melts at 150–151° C. Its hydrochloride is obtained in the form of white crystals melting at 247–249° C.

*Example 10*

A solution of 11.5 parts of 1-phenyl-4-chloropyrazolo-(3,4-d)pyrimidine and 10 parts of hydrazine hydrate in 100 parts by volume is heated for 6 hours at the boil. The whole is allowed to cool and the crystalline precipitate is then filtered off. 1-phenyl-4-hydrazino-pyrazolo(3,4-d)pyrimidine of the formula

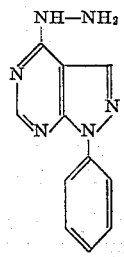

is obtained in the form of white crystals melting at 180–181° C. From 2 N-hydrochloric acid the hydrochloride melting at 209–210° C. can be obtained.

*Example 11*

115 parts of 2-phenyl-3-amino-4-carbethoxy-pyrazole and 18 parts of urea are thoroughly mixed together and heated for one hour in a bath having a temperature of 200° C. The hot melt is then introduced into a large quantity of water, the mixture is filtered to remove insoluble matter, and the filtrate is adjusted to a pH value of 2 with 2 N-hydrochloric acid. A brownish precipitate is immediately formed, and is recrystallized from a large quantity of ethyl alcohol. 1-phenyl-4,6-dihydroxy-pyrazolo(3,4-d)pyrimidine of the formula

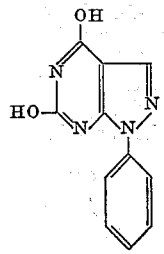

is obtained in the form of strongly brownish crystals melting at 297–299° C.

*Example 12*

5.7 parts of 1-phenyl-4-chloro-pyrazolo(3,4-d)pyrimidine are dissolved in 400 parts by volume of alcohol and hydrogenated at room temperature with 0.5 gram of 10 percent palladium-charcoal as catalyst. 1130 parts by volume of hydrogen, which corresponds to 2 mols of $H_2$, are consumed. The mixture is then filtered to remove the catalyst and the filtrate is evaporated to dryness in vacuo. By recrystallization from ethyl acetate and alcohol in the ratio 5:1 there is obtained the hydrochloride of 1-phenyl-2,3-dihydropyrazolo(3,4-d)pyrimidine in the form of white crystals melting at 200–201° C.

Example 13

5 parts of 2-phenyl-3-amino-4-carbamyl-pyrazole and 9 parts of urea are mixed thoroughly. The mixture is heated for half an hour on an oil bath having a temperature of 190° C. and then at 200° C. for a quarter of an hour. The melt is extracted while hot with caustic soda solution and the alkaline filtrate given a pH of 3 with hydrochloric acid, whereupon 1-phenyl-4,6-dihydroxy-pyrazolo(3,4-d)pyrimidine of melting point 297–299° C. is obtained.

The starting material is obtained as follows:

100 parts by volume of 2 N-caustic soda solution are added to a solution of 5 parts of 2-phenyl-3-amino-4-cyano-pyrazole in 100 parts by volume of alcohol and the mixture boiled for 3 hours. The alcohol is then expelled under reduced pressure, whereupon a solid product precipitates. The latter is recrystallized and 2-phenyl-3-amino-4-carbamyl-pyrazole of the formula

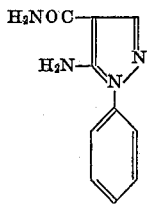

obtained in the form of crystals melting at 167–168° C. The 2-phenyl-3-amino-4-cyano-pyrazole can be prepared as follows:

24.4 parts of ethoxymethylenemalonic acid dinitrile are dissolved in 250 parts by volume of ethyl alcohol. The solution is then slowly mixed with 2.2 parts of phenylhydrazine and boiled for 10 hours. The reaction mass is allowed to cool, after which a crystalline product precipitates which is separated by filtering with suction. By recrystallization from alcohol there is obtained 2-phenyl-3-amino-4-cyano-pyrazole of the formula

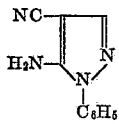

in the form of crystals of melting point 135–137° C.

Example 14

10 parts of 2-phenyl-3-amino-4-carbamyl-pyrazole are introduced into 50 parts by volume of acetic anhydride and the solution boiled for 6 hours. After cooling, a white product precipitates which is separated by filtering with suction. 1 - phenyl-4-hydroxy - 6 - methyl-pyrazolo (3,4-d)pyrimidine of the formula

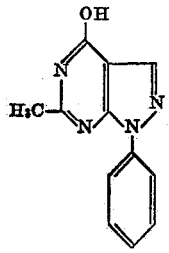

is obtained in the form of white crystals of melting point 283–285° C.

Example 15

26.5 parts of 2-(p-chlorophenyl)-3-amino-4-carbethoxy-pyrazole and 100 parts by volume of formamide are heated for 8 hours in a bath having a temperature of 200–210° C. After cooling, the crystalline deposit is separated by filtering with suction, dissolved in 2 N-caustic soda solution, treated with animal charcoal and precipitated by adjusting the pH to 3 with 2 N-hydrochloric acid. By recrystallization from dimethyl - formamide there is obtained 1-(p-chlorophenyl)-4-hydroxy-pyrazolo (3,4-d)pyrimidine of the formula

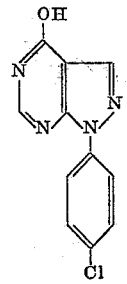

in the form of white crystals which do not melt when heated at 300° C.

The 2-(p-chlorophenyl)-3-amino-4-carbethoxy-pyrazole used as starting material is obtained as follows:

A solution of 85 parts of ethoxymethylenecyanoacetic acid ethyl ester in 500 parts by volume of alcohol is slowly mixed with 71 parts of p-chloro-phenylhydrazine. When the addition is finished the mixture is heated to the boil for 2 hours to complete the reaction. The reaction mass is allowed to cool and the deposit separated by filtering with suction. By recrystallization from alcohol there is obtained 2-(p-chlorophenyl)-3-amino-4-carbethoxy - pyrazole of the formula

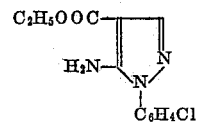

in the form of white crystals of melting point 145–146° C.

Example 16

17 parts of 1-(p-chlorophenyl) - 4 - hydroxy-pyrazolo-(3,4-d)pyrimidine and 100 parts by volume of phosphorus oxychloride are heated for 5 hours in an oil bath having a temperature of 150° C. The phosphorus oxychloride is then evaporated under reduced pressure, the residue mixed with ice-water, the pH adjusted to 8 with 2 N-caustic soda solution, and the mixture extracted with benzene. The residue is recrystallized from boiling carbon tetrachloride to obtain 1-(p-chlorophenyl)-4-chloro-pyrazolo(3,4-d)pyrimidine of the formula

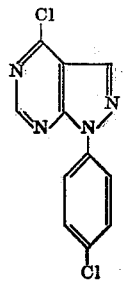

in the form of white crystals melting at 133–135° C.

Example 17

9 parts of 1-(p-chlorophenyl)-4-chloro-pyrazolo(3,4-d)-pyrimidine and 6 parts of 5-diethylamino-2-amino-pentane are introduced into 400 parts by volume of toluene and the mixture refluxed for 6 hours. After cooling, the precipitated hydrochloride of 5-diethylamino-2-amino-pentane is separated by filtering with suction and the filtrate evaporated to dryness in vacuo. The residue is distilled, and 1-(p-chlorophenyl)-4-(δ-diethylamino-α- methyl-butylamino)-pyrazolo(3,4-d)pyrimidine of the formula

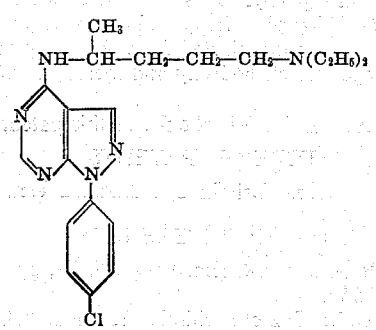

passes over at 238–240° C. under 0.1 mm. pressure.

*Example 18*

A solution of 23 parts of 1-phenyl-4-chloropyrazolo-(3,4-d)pyrimidine and 17 parts of piperidine in 400 parts by volume of toluene is boiled for 10 hours. After cooling, the precipitated piperidine hydrochloride is separated by filtering with suction and the filtrate is evaporated to dryness under reduced pressure. The residue is recrystallized from a mixture of carbon tetrachloride and petroleum ether (2:1), and 1-phenyl-4-piperidino-pyrazolo(3,4-d)pyrimidine of the formula

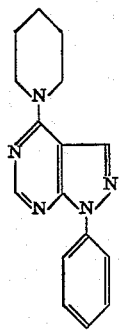

obtained in the form of white crystals of melting point 110–112° C.

*Example 19*

2.2 parts of sodium are introduced into 200 parts by volume of anhydrous alcohol. As soon as all the sodium is dissolved, 6.9 parts of hydroxylamine hydrochloride are added to the solution, and the whole is stirred for 1 hour at room temperature. After that, 11.5 parts of the 1-phenyl-4-chloro-pyrazolo(3,4-d)pyrimidine obtained according to Example 2 are added to the solution, which is then stirred at room temperature for 2 hours, and boiled for 4 hours. The precipitated sodium chloride is removed by filtering with suction and the filtrate evaporated to dryness in vacuo. The residue is crystallized from alcohol and 1-phenyl-4-hydroxylamino-pyrazolo(3,4-d)pyrimidine of the formula

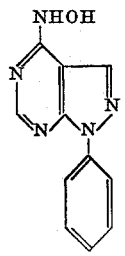

obtained in the form of white crystals of melting point 170–172° C. (decomposition).

*Example 20*

11.5 parts of the 1-phenyl-4-chloro-pyrazolo(3,4-d)-pyrimidine obtained according to Example 2 are introduced into a solution of 12 parts of ethylene diamine in 200 parts by volume of alcohol, and the mixture is boiled for 6 hours. The precipitated crystals are removed by filtering with suction. The filtrate is evaporated to dryness in vacuo and the residue taken up in a small amount of water, whereupon a crystalline precipitate is formed which is removed by filtering with suction. The two crystalline deposits are mixed with alcoholic hydrochloric acid to obtain a hydrochloride of 1-phenyl-4-(β-amino-ethylamino)-pyrazolo(3,4-d)pyrimidine of the formula

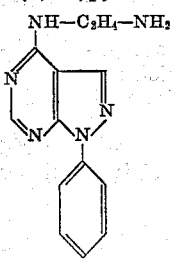

in the form of white crystals of melting point 268–270° C.

*Example 21*

A solution of 15 parts of 1-phenyl-4-chloro-pyrazolo-(3,4-d)pyrimidine in 150 parts by volume of benzene is mixed with 6 parts of ethylene imine and the mixture stirred at room temperature for 3 hours and then in a bath having a temperature of 60° C. for another 3 hours. The benzene is evaporated under reduced pressure and the residue crystallized from a large quantity of petroleum ether. 1-phenyl-4-ethylene-imino-pyrazolo(3,4-d)pyrimidine of the formula

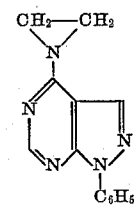

is obtained in the form of white crystals of melting point 124–125° C.

By mixing the above base with 1 N-hydrochloric acid there is obtained the hydrochloride. The melting point of the latter is at 284–285° C.

What is claimed is:

1. 1-phenyl-4-hydroxy-pyrazolo(3,4-d)pyrimidine.
2. 1-phenyl-4,6-dihydroxy-pyrazolo(3,4-d)pyrimidine.
3. 1-phenyl-4-hydroxy - 6 - methyl - pyrazolo(3,4-d) pyrimidine.
4. 1-phenyl-4-furfurylamino - pyrazolo(3,4-d) pyrimidine.
5. 1-phenyl-4-chloro-pyrazolo(3,4-d)pyrimidine.
6. 1-phenyl-4-mercapto-pyrazolo(3,4-d)pyrimidine.
7. 1-phenyl-4-amino-pyrazolo(3,4-d)pyrimidine.
8. A member selected from the group consisting of pyrazolo(3,4-d)pyrimidine, of the formula

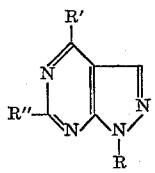

wherein R is a member selected from the group consisting of phenyl, halo-phenyl, lower alkyl-phenyl and nitro-phenyl, R' stands for a member selected from the group consisting of halogen, hydroxy, mercapto, amino, hydroxylamino and hydrazino, lower alkoxy, lower mono-azaalkoxy, lower alkyl mercapto, lower alkylamino, lower dialkylamino, lower alkyleneimino, morpholino, amino-lower alkylamino, mono-lower alkylamino-lower alkyl-amino, di-lower alkylamino-lower alkylamino groups and the furfurylamino group, and R" stands for a member selected from the group consisting of hydrogen, lower alkyl, hydroxy and mercapto and their therapeutically useful acid addition salts.

9. 1-halophenyl-4-hydroxy-pyrazolo(3,4-d)pyrimidine.

10. 1-halophenyl - 4,6 - dihydroxy-pyrazolo(3,4-d)pyrimidine.

11. 1-halophenyl - 4 - halogen-pyrazolo(3,4-d)pyrimidine.

12. 1-halophenyl - 4 - di - lower-alkylamino-pyrazolo(3,4-d)pyrimidine.

13. 1-lower - alkylphenyl - 4 - di - lower-alkylamino-pyrazolo(3,4-d)pyrimidine.

14. 1-phenyl - 4 - lower-alkyleneimino-pyrazolo(3,4-d)pyrimidine.

15. Alkali metal salts of 1-X-4-Y-6-Z-pyrazolo(3,4-d) pyrimidine in which X is a member selected from the group consisting of phenyl, halo-phenyl, lower-alkyl-phenyl and nitro-phenyl, Y is a member selected from the group consisting of hydroxy and mercapto groups, and Z stands for a member selected from the group consisting of the hydrogen atom, hydroxy and mercapto groups.

References Cited in the file of this patent

FOREIGN PATENTS 716,327    Great Britain _____ Oct. 6, 1954

OTHER REFERENCES

Robins: Jour. Amer. Chem. Soc., vol. 78, pp. 785–790 (Feb. 20, 1956).

Justoni et al.: Gazzetta chimica Italiana, vol. 68, pp. 59–76 (1938).

Certificate of Correction

Patent No. 2,965,643 December 20, 1960

Jean Druey et al.

It is hereby certified that error appears in the above numbered patent requiring correction and that the said Letters Patent should read as corrected below.

Column 4, lines 32 to 42, the formula should appear as shown below instead of as in the patent:

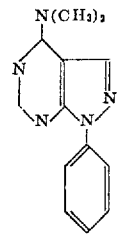

column 5, lines 3 to 15, the formula should appear as shown below instead of as in the patent:

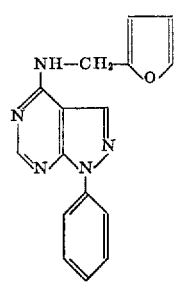

same column 5, line 31, at the top of the structural formula, for "OCH$_2$" read —OCH$_3$—; column 7, lines 20 to 28, the formula should appear as shown below instead of as in the patent:

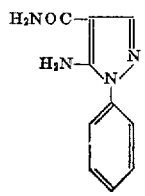

Signed and sealed this 7th day of November 1961.

[SEAL]

Attest:
ERNEST W. SWIDER,
*Attesting Officer.*

DAVID L. LADD,
*Commissioner of Patents.*